United States Patent [19]

Vorobiev et al.

[11] 4,133,714
[45] Jan. 9, 1979

[54] REACTION VESSEL WITH PULSATING MEANS FOR PRODUCING LIGNOCELLULOSE PRODUCT FROM CRUSHED VEGETABLE RAW MATERIALS

[76] Inventors: Jury P. Vorobiev, prospekt Morisa Toreza, 26, kv. 35; Jury S. Ivanov, Grazhdansky prospekt, 126/3, kv. 104; Lazar O. Ioffe, Grazhdansky prospekt, 87/2, kv. 57, all of Leningrad; Susanna M. Karpacheva, 2 Schukinsky proezd, 2, kv. 88, Moscow; Irina S. Kukurechenko, Chekhovskay ulitsa, 3, kv. 11, Moscow; Valerian M. Muratov, Astakhovsky pereulok, 1/2, kv. 118, Moscow; Viktor P. Serebryakov, ulitsa Marshala Tukhachevskogo, 21/1, kv. 12, Moscow; Viktor A. Shiyanov, Olginskaya ulitsa, 6, kv. 24, Leningrad, all of U.S.S.R.

[21] Appl. No.: 723,602

[22] Filed: Sep. 15, 1976

[30] Foreign Application Priority Data

Oct. 3, 1975 [SU] U.S.S.R. .............................. 2173766

[51] Int. Cl.² .......................... D21C 7/00; D21C 7/10; D21C 7/14
[52] U.S. Cl. ..................................... 162/237; 162/65; 162/242; 162/243; 162/250; 162/251; 261/82; 261/114 JP; 422/226
[58] Field of Search .................... 162/65, 55, 242, 243, 162/237, 251, 250, 60, 236; 8/156; 23/283; 261/114 JP, 82, 114 R

[56] References Cited

U.S. PATENT DOCUMENTS

| 54,510 | 5/1866 | Dixon et al. | 162/237 |
|---|---|---|---|
| 1,803,444 | 5/1931 | Hildebrandt | 162/250 X |
| 2,639,947 | 5/1953 | Tramm et al. | 261/111 |
| 2,737,377 | 3/1956 | Huggins et al. | 261/114 JP |
| 2,787,453 | 4/1957 | Hibshman et al. | 261/114 JP |
| 2,853,281 | 9/1958 | Hibshman et al. | 261/114 JP |
| 3,150,038 | 9/1964 | Rich | 162/237 |
| 3,298,900 | 1/1967 | Laakso | 162/237 X |
| 3,303,088 | 2/1967 | Gessner | 162/60 |
| 3,475,271 | 10/1969 | Laakso | 162/251 |
| 3,654,070 | 4/1972 | Pradt et al. | 162/65 |
| 3,700,548 | 10/1972 | Rich | 162/57 |
| 3,711,367 | 1/1973 | Christenson | 162/251 |
| 3,754,417 | 8/1973 | Jamieson | 162/65 X |
| 3,830,688 | 8/1974 | Mannbro | 162/65 |
| 3,855,368 | 12/1974 | Prochazka et al. | 261/82 |
| 3,951,733 | 4/1976 | Phillips | 162/65 |

FOREIGN PATENT DOCUMENTS 980959 1/1976 Canada .............................. 162/88

*Primary Examiner*—S. Leon Bashore
*Assistant Examiner*—Steve Alvo
*Attorney, Agent, or Firm*—Steinberg & Blake

[57] ABSTRACT

Apparatus for the production of a lignocellulose material from chips, sawdust, chopped plants, bark, small fibres comprising a vertical column with a series of successively-mounted horizontal perforated plates partly abutting upon the inner surface of the column; at the free ends of said plates retaining baffles are secured for partial entrapment of coarse particles of the product; a clearance is provided between the baffle and inner surface of the column and the plates are disposed relative to each other so that baffles of each successive plate are located diametrically opposite to the baffles of each preceding plate thus forming a zigzag labyrinth along the total height of the column for increasing the time of contact of coarse particles of the raw materials with the oxygen-containing gas and alkaline reagent.

A pulsator means is operably connected to the column for setting liquid reagents in the column into reciprocating vertical motion. Each plate being formed with a plurality of openings, at least some of the openings having a plurality of guide vanes so that the liquid reagents upon passing through the openings will move horizontally with respect to the plates.

16 Claims, 6 Drawing Figures

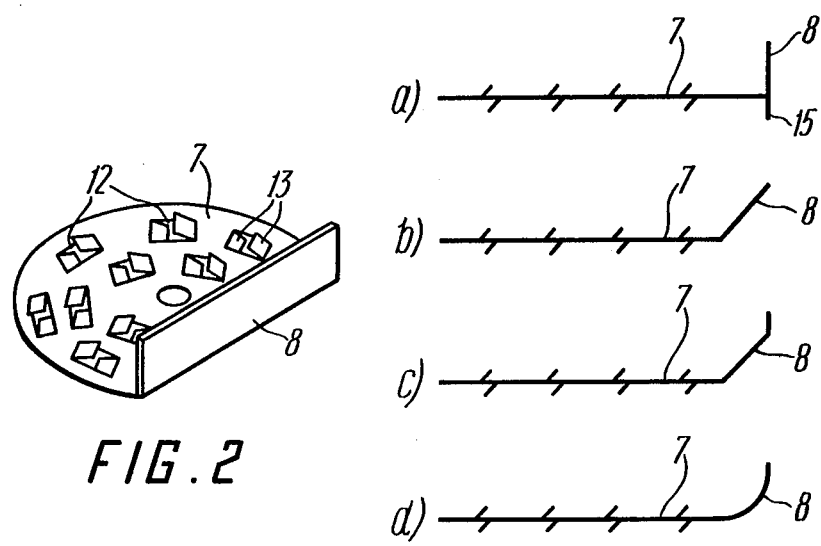
FIG.2
FIG.3
FIG.4
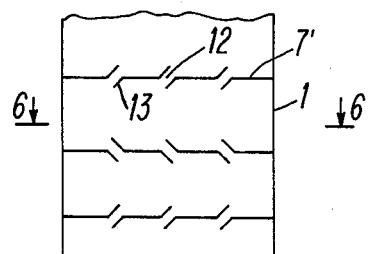
FIG.5
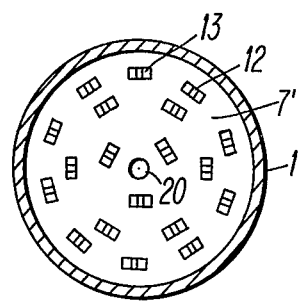
FIG.6

REACTION VESSEL WITH PULSATING MEANS FOR PRODUCING LIGNOCELLULOSE PRODUCT FROM CRUSHED VEGETABLE RAW MATERIALS

The present invention relates to apparatus for producing a lignocellulose product from crushed raw materials to be employed in pulp-paper industry, hydrolysis, microbiology and other related industries.

The present invention is most useful for the production of said product from chips, sawdust, chopped straw of plants, bark, fine fibres, hydrolytic lignine, pulp and the like.

More specifically, such an apparatus may be useful in pulp-paper industry for cooking pulp from chips, shavings or sawdust and the like materials with the use of an oxygen-containing gas; for delignification and bleaching of pulp prefabricates with the use of an oxygen-containing gas; for treatment, by means of an oxygen-containing gas, in a neutral or alkaline (such as ammonia) medium, of small fibres, bark, finely-divided waste sawmill products, hydrolysis lignine, slime obtained from purification installations with a view to produce fertilizers therefrom and to isolate a substrate, for a biochemical treatment, from dissolved substances.

Known in the art is a reaction vessel designed by the "Kamyr" company for the treatment of a cellulose-containing materials with gaseous reagents such as an oxygen-containing gas. This vessel is divided, along its height, into several sections with horizontal rotating partitions. The mass is transferred from one section to another due to the provision, in said rotating horizontal partitions, of perforated regions.

Apparatus for the treatment of a cellulose-containing material including such a reaction vessel ensure a continuous operation upon interaction of three phases (solid-liquid-gas).

The use of a similar reaction vessel is encountered, however, with the necessity to provide a great number of moving parts thereinside, lack of intermixing in each section, wherefore the gas is non-uniformly distributed along the slurry bed height in each section.

In the upper zone of the bed contacting with the gaseous phase the gas concentration is relatively high, while it progressively reduced in the direction from the bed top to its bottom. Furthermore, this reaction vessel is unsuitable for slurries with a low concentration of the cellulose-containing material, wherein the drop of the dissolved gas concentration from the bed top towards the bottom thereof will be even greater.

In the reaction vessel developed by the "Kamyr" company a substantial portion of the working space is occupied, quite uselessly, by a continuous gaseous phase without any contact of the latter with the slurry of the cellulose-containing material.

Such reaction vessel does not make it possible to treat a wood-pulp material with coarse particles of the solid phase, for example, chips in the removal of delignified fibres upon their separation from chips during the treatment. This is due to the fact that the whole slurry is uniformly moved from the upper section to the lower one. The final product becomes non-uniform and features insufficient quality characteristics.

Also known in the art is an insertion for pulsation-operating extraction columns embodied in the form of a package of horizontal perforated plates wherein, for the purpose of reducing longitudinal agitation of the liquid during operation, the plate openings are provided with two guiding vanes located at both sides of the plate parallel to each other and inclined to the plate surface.

Axes of vanes of two adjacent plates are crossed at an angle of $2\alpha$ which ensures, upon superposition of pulsations, a screw-like movement of the streams in neighbouring interplate spaces of the package and reduced agitation of the liquid in the longitudinal direction.

The above-described insertion is employed in radio chemical industry, non-ferrous metallurgy, hydrometallurgy for the treatment, among others, of a three-phase system: liquid-solid-gas.

However, this insertion does not enable the treatment of solid articles of a large size which cannot pass through the plate openings. Increased dimensions of the latter impair uniformity of the phase intermixing. In apparatus provided with such an insertion member there is no possibility to control the residence time of the solid phase in the apparatus, in particular, in the case of solid materials with different fraction compositions. Lastly, apparatus with such an insertion were employed in the processes performed without use of greater than atmospheric pressures which did not make it possible to use them as reactors wherein a process is effected with aqueous suspensions at a temperature of above 100° C. at greater than atmospheric pressure.

Further known in the art is an apparatus for producing a lignocellulose product from crushed vegetable raw materials. It comprises a reaction vessel adapted for operation at greater than atmospheric pressure. The upper zone of the apparatus has a feeding means for the supply of raw materials, while in the lower zone there is a means for admission of an oxygen-containing gas. The means for the supply of an alkaline reagent provides for a possibility of supplying the alkaline reagent along substantially entire height of the reaction vessel.

The vessel surface is partly enclosed with heat-exchangers for changing temperature inside the vessel thus initiating the reaction of the raw materials, an alkali reagent and an oxygen-containing gas which results in the formation of a lignocellulose product and a liquor, which are discharged from the bottom section of the vessel, and a waste gas which is discharged from top section of the vessel.

The reaction vessel is divided, along its height, into zones; in each zone there is provided a certain stirring means.

The stirring means are embodied in the form of impellers, impellers with mechanized arms, manipulator-type agitators as well as immobile stirring means ensuring intermixing owing to gas bubbling or air-lift mixing devices. The reaction vessel has a toroidal shape and is positioned horizontally so that the slurry can perform a circular movement with an interface plane between the slurry and gas.

The stirring devices employed in the reaction vessel have certain disadvantages and do not provide a uniform intermixing of the three phases for the following reasons: mechanical devices ensure a good agitation of the slurry per se, but do not effect a good intermixing of the slurry and gas. When bubbled, the gas passes through the slurry in large bubbles having but a small area of contact with the slurry of lignocellulose stock.

Air-lift mixing devices ensure intermixing of a gas with a slurry in pipes without any intermixing in the remaining space of the reaction vessel. In a toroidal-shape reaction vessel the area of the contact surface between the slurry and gaseous phase is rather small.

Another disadvantage of the mixing devices resides their unsuitability for the treatment of coarse particles such as wood chips, since in this case the chips create clogging at the bottom of each zone of the reaction vessel.

A further disadvantage of the prior art apparatus resides in the same displacement velocity of particles of the treated raw materials which have different dimensions in the reaction vessel in the downward direction irrespective of their size, whereas the treatment time for coarse particles should be, obviously, longer. Moreover, the prior art apparatus does not enable separation of digested fibres from chips and rapid removal thereof from the reaction zone.

Structural arrangement of the stirring means in the prior art apparatus requires the presence of a continuous gas phase in each zone of the reaction vessel, thus increasing the volume of the latter without, however, substantially increasing the contact area of the reacting phases.

It is an object of the present invention to provide an apparatus for producing a lignocellulose product and a waste liquor from crushed raw materials upon conducting a reaction in a ternary system: solid-liquid-gas ensuring a uniform interaction of all the three phases with the use of starting materials having different fractional composition.

Another important object of the present invention is to improve the lignocellulose product and waste liquor quality.

A further object of the present invention is to provide an apparatus ensuring more rapid discharge of fine particles of the lignocellulose product from the reaction vessel while ensuring, at the same time, a longer reaction time for coarse particles of the starting materials.

Still another object of the present invention is to provide an apparatus, wherein substantially the total volume of the reaction vessel is occupied by intermixed reacting phases without, however, any substantial portion of the reaction vessel volume being occupied by one or two of the three phases.

It is also an object of the present invention to provide an apparatus comprising a reaction vessel having only immobile parts ensuring contact between the reacting phases.

These and other objects are accomplished by that in an apparatus for producing a lignocellulose product from crushed vegetable raw materials comprising a reaction vessel adapted for operation at greater than atmospheric pressure with a feeding means for the supply of raw materials located in the upper section of the reaction vessel and a means for admission of an oxygen-containing gas located in the bottom section of the apparatus, a means for the supply of an alkaline reagent substantially along the entire height of the reaction vessel; heat-exchangers partially encircling the reaction vessel and adapted for changing temperature thereinside thus initiating the reaction between said raw materials, alkaline reagent and oxygen-containing gas with the formation of a lignocellulose product and a liquor discharged from the bottom section of the reaction vessel and a spent gas discharged from the top section of the reaction vessel. In accordance with the present invention, the reaction vessel comprises a vertical column provided with a series of horizontal perforated plates mounted in succession; each of the plates being adjacent, by a substantial part of its periphery, to the inner surface of the column while at the free part of the plate periphery there is a straight region having mounted thereon a retaining baffle adapted for a partial entrainment of coarse particles; a gap is provided between the baffle and column surface and said plates are mounted relative to each other in such a manner that baffles on each successive plate are disposed diametrically opposite relative to the baffles of each preceding plate thus forming, along the entire column height, a zigzag labyrinth for increasing the time of contact of coarse particles of the starting raw materials with the oxygen-containing gas and alkaline reagent; a means is also provided in said column for the supply of an additional amount of liquid required for preventing the lignocellulose product from clogging in the column; the lower section of said column being connected, by means of a tube forming a pulse-line, with a pulsator imparting reciprocal movement to the liquid reagents partially through the plate openings and partially through the labyrinth.

The use of a vertical column with a series of successively mounted perforated plates as a reaction vessel makes it possible to perform a continuous process upon contacting three phases: solid-liquid-gas.

The use of perforated plates with a periphery partly spaced from to the inner surface of the column and with retaining baffles makes it possible to carry out the reaction using the starting raw materials with different fractional composition; the contact time of coarse particles in the column is increased owing to the fact that coarse particles can be moved through the column only by flowing over retaining baffles in the zigzag labyrinth, while fine particles can also pass through the plate openings. In doing so, the product quality is improved due to reduced contact time of small particles and increased contact time for coarse ones. During the reaction of vegetable raw materials the lignocellulose fibres could create clogging in the column thus hindering interaction of the starting materials with the reagents and movement of the product along the column. The means for the supply of an additional amount of liquid makes it possible to wash such fibre aggregates out of the column thus preventing impaired phase contact.

Connection of the lower section of the column, via a pulse-line, to a pulsator imparting reciprocal motion to the liquid in said column also ensures mobility of the solid phase in the column as well as reactivation, in combination with perforated plates, of the contact surface between the reacting phases without any use of movable parts inside the reaction vessel and without the formation of a large volume occupied by any one or two of the three interacting phases.

In the apparatus according to the present invention, openings in horizontal plates are disposed along concentric circles and have a rectangular shape; in the zone of said openings at the end faces of the plates there are vanes disposed parallel to each other at an angle of from 1 to 60° to said faces.

The use of rectangular openings disposed along concentric circles with vanes located in the zone of said openings parallel and towards each other at an angle of from 1 to 60° to the plate surface ensures a rotating motion of the slurry on each plate and disintegrative of the gas bubbles on the vanes under the action of the pulsator. This improves transportation of the solid phase along the column and enhances contact between the reacting phases.

To ensure a more precise fixation of the plate positions relative to each other and prevent them from disalignment during the liquid pulsation, spacers are provided between the plates in the apparatus according to the present invention.

In the apparatus according to the present invention the distance between the retaining baffle and overlying plate exceeds the maximal particle size of the intermediate product during the reaction. Such structural embodiment prevents clogging of coarse particles of the intermediate product in the column during the reaction.

Besides, in the apparatus according to the present invention the lower edge of the retaining baffle is slightly extended below the plate so that the total plate height does not exceed the distance between two neighbouring plates. This prevents the gas from passing directly through the labyrinth avoiding plate perforations which could result in impaired contact between the interacting phases.

To obtain the spent liquor in a more concentrated form facilitating its further utilization in the apparatus according to the present invention, the means for supplying an additional amount of liquid contains in series connection a mass-discharging unit, a washing unit for the final product, a pump and pipelines for the spent liquor.

To increase rigidity of the plate fixation and facilitate dismountling of the reaction column, in the apparatus according to the present invention the horizontal plates are secured to a hollow vertical rod.

In the apparatus according to the present invention said hollow rod has perforations through which an additional amount of liquid or spent liquor is fed along the entire height of the column.

These perforations make it possible to use the rod as a means for the supply of liquid reagents into the column as well as an additional amount of the liquid along the entire height of the reaction column.

It is advisable that inside the lower section of the reaction column, between the lowermost perforated plate and pulse-line a fractionating means be provided dividing the section volume into zones for accumulation of coarse and fine particles of the lignicellulose product; coarse particles should be transported, by an appropriate conveyor means, to the upper section of the column. This would ensure separation of coarse and fine particles inside the column, the coarse particles being delivered to repeated treatment in the upper section of the column by a transporting means. This arrangement ensures a higher quality, in particular uniformity, of the final product discharged only from the zone of accumulation of fine particles, while coarse particles are subjected to a repeated treatment in the reaction column.

In the apparatus according to the present invention, rectangular openings of the plates are disposed in such a manner that their major axes coincide with tangents to arcs passing through opposite points located along a straight line perpendicular to and bisecting the baffle.

This ensures a greater uniformity of the final product, since the time of residence of each individual coarse particle of the material being treated at the plate surface is stabilized.

The use of horizontal plates in the pulp bleaching, which plates abut upon the entire inner surface of the column, makes it possible to eliminate the presence of coarse less-delignified fibres or bundles thereof in the final product which results in improved quality of the latter, simplified arrangement of plates and increased reliability of the column operation.

For a better understanding of the present invention, a specific example of its embodiment is given hereinbelow with reference to the accompanying drawings, wherein:

FIG. 2 is a general view of a plate with a retaining baffle;

Figure 1:
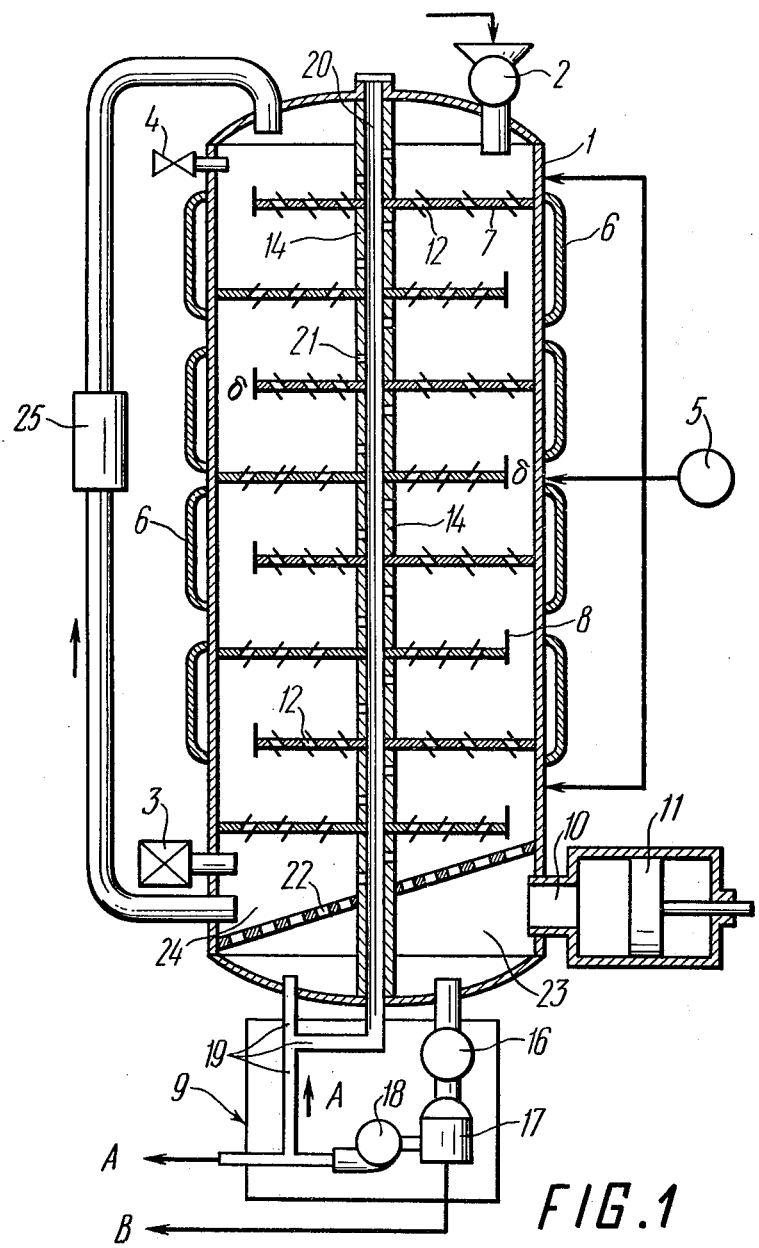
FIG. 1 is a schematic diagram illustrating the apparatus according to the present invention for producing a lignocellulose product from crushed vegetable raw materials.

FIGS. 3 a, b, c, d — the same plate as in FIG. 2 but with different embodiments of the retaining baffle;

FIG. 4 shows another embodiment of the plate, top view;

FIG. 5 shows schematically in a fragmentary elevation another embodiment where the perforated plates extend completely across the interior of the reaction vessel; and FIG. 6 is a schematic partly sectional plan view taken along line 6—6 of FIG. 5 in the direction of the arrows.

The apparatus according to the present invention comprises a reaction vessel 1 in the form of a vertical column adapted for operation under an overatmospheric pressure.

In the upper section of the reaction vessel 1 there is a feeding means 2 for the supply of a lignocellulose material.

In the lower section of the reaction vessel 1 there is a means 3 for admission of an oxygen-containing gas, while the spent gas is discharged through a means 4 located in the upper section of said reaction vessel 1.

The reaction vessel 1 is connected to a means 5 for the supply of an alkaline reagent substantially along the entire height of the column formed by the reaction vessel 1. Heat-exhangers 6 are located along the entire height of the reaction vessel 1 and adapted for changing temperature inside the vessel thus resulting in interaction between the starting raw materials, alkaline reagent and oxygen-containing gas.

Inside the reaction vessel 1 there are horizontal perforated plates 7 mounted in succession and abutting, by a substantial part of their periphery, upon the inner surface of the column.

At a straight region of the free part of the plate periphery there are fixed retaining baffles 8 for entrapment of coarse particles. This enables treatment of the starting raw materials having different fractional compositions. A clearance "δ" is provided between a baffle 8 and the inner surface of vessel 1; plates 7 are disposed in such a manner relative to each other that along the column height they form a zigzag labyrinth for a better contact of coarse particles being moved along the column with the oxygen-containing gas and alkaline reagent. The retaining baffle 8 is positioned so that the distance between it and an overlying plate exceeds the maximal particle size of the intermediate product during the reaction.

To avoid formation of aggregates of the lignocellulose material in the column 1 a means 9 is provided for the supply of an additional amount of a liquid which means is connected with the lower section of the reaction vessel.

To set the liquid reagents in the column 1 into reciprocal movement, the lower section of the column is connected, by means of a tube forming a pulse-line 10 with a pulsator 11.

Perforated plates 7 have openings 12 of a rectangular shape; within the zone of said openings there are vanes 13 positioned parallel and towards each other at an angle of from 1 to 60° (FIG. 2) which ensure the gas desintegration and rotating motion of the slurry under the action of the pulsator.

Spacers 14 (FIG. 1) are mounted between the plates to ensure fixation thereof relative to each other. The spacers 14 are in the form of coaxial tubular members fixed at their ends to opposed surfaces of the plates 7 and having their coaxial hollow interiors aligned with central openings of the plates 7, so as to form in this way a hollow rod 20. Moreover, these spacers 14 are formed with the openings 21 passing through the walls thereof, as illustrated in FIG. 1.

Retaining baffles 8 have an edge 15 (FIG. 3) extending below the plate so that the plate height does not exceed the distance between two neighbouring plates.

Retaining baffle 8 can be inclined to the plane of each plate 7 at an angle of from 5 to 150° and have various shapes as shown in FIGS. 3a, b, c, d. The means 9 for the supply of an additional amount of liquid (FIG. 1) comprises series-connected a discharging unit 16, washing unit 17 for the final product, pump 18 and pipelines 19 for delivering the waste liquor to the lower section of the reaction vessel 1 and into the hollow rod 20. Removal of the waste liquor is shown by arrow "A" and that of the final product — by arrow "B". Thus, the means 9 forms a discharge means for discharging from the vessel 1 an output which includes the final product and liquor.

Perforated plates 7 are fixed at the hollow vertical rod 20 with perforation 21 through which an additional amount of liquid or the waste liquor is fed into the column along its height.

Inside the lower section of the reaction vessel 1 between the lowermost perforated plate 7 and pulse-line 10 a fractionating means 22 is provided which divides the section volume into a zone 23 for accumulation of fine particles and zone 24 for accumulation of coarse particles of the lignocellulose product. The fractionating means ensures separation of coarse and fine particles already inside the column. Zone 24 for accumulation of coarse particles communicates, via a transporting means 25, with the upper section of the reaction vessel 1 for repeated treatment of coarse particles.

The use of said transporting means 25 results in a greater uniformity of the final product due to recycling coarse particles to the column for a further treatment.

Rectangular openings 12 (FIG. 4) of plates 7 can be disposed so that their major axes will coincide with tangents to the circular arcs a passing through the opposite points "C" and "D" located from each other at the distance d along a straight line perpendicular to and bisecting the baffle 8. Such arrangement of openings 12 on plates 7 results in a stabilized residence time of each individual coarse particle at the surface of plates 7.

Plates 7' can be provided abutting upon the entire periphery of the column 1, without baffles 8, as shown in FIGS. 5 and 6 wherefore their manufacture and assembly are substantially simplified and reliability of operation thereof is increased. Such arrangement is advisable for treatment of the starting raw materials readily passing through rectangular openings 12 of plates 7', for example in the pulp bleaching.

The operation principle of the apparatus according to the present invention is the following.

A lignocellulose material such as steam-treated chips is charged, by means of the feeder 2 into the reaction vessel 1 onto the uppermost perforated plate 7 mounted on the vertical rod 20. A solution of reagents, for example an aqueous solution of ammonia, is delivered into the reaction vessel 1 from means 5, while steam is admitted into heat-exchangers 6 to heat the reaction vessel contents.

An oxygen-containing gas is admitted into the lower section of the reaction vessel 1 through a means 3; this gas has its bubbles disintegrated by vanes 13 and due to liquid pulsations gradually ascends without, however, formation of a continuous gaseous phase. Into the lower section of the reaction vessel 1, namely into the accumulation zone 23 for fine particles a pulse from the pulsator 11 is supplied via the pulse-line 10 which causes liquid pulsations in opposite directions. The liquid pulsation pulse has an intensity of 100 to 6000 mm/min. The pulsation intensity is characterized by the product of pulse frequency (cycles/min) by the pulsation amplitude (mm).

Under the effect of pulsations and vanes 13, the slurry of chips is set into rotating motion and from the upper plate 7 the chips overflow the retaining baffle 8 and pass onto the second (from top) plate 7. The distance between two neighboring plates is fixed by means of spacers 14 of hollow rod 20. At the second plate 7 chips are rotated in the opposite direction due to the opposite arrangement of vanes 13; the chips are further moved towards the baffle 8 located at the diametrically opposite side relative to the baffle 8 of the overlying plate; the cycle is repeated in the same manner down to the fractionating means 22 which is intended to separate the non-digested mass from the fibrous slurry.

Plate baffle 8 makes it possible to retain the material being treated for the time required for a complete interaction of the reacting substances. The fractionating means 22 ensures accumulation of the fibrous slurry in the zone 23 for fine particles, while the non-digested mass is accumulated in the zone 24 of the lower section of the reaction vessel 1.

Cellulose fibres are passing through the reaction vessel 1 at a higher rate as compared to coarse particles, since they are agitated not only by overflowing baffles 8, but also by flowing through rectangular openings 12 of plates 7, whereby they are rapidly discharged from the reaction vessel. As a result, an opportunity is provided for treating starting raw materials having different fractional compositions. In the case where said rectangular openings are disposed on plates 7 in such manner that their major axes "a" coincide with the tangents to the arcs a passing through opposite points "C" and "D" located at the distance d along a straight line perpendicular to and bisecting the baffle edge, a high uniformity of the final product is achieved. The time of residence of each individual coarse particle of the material being treated at the plate 7 surface is, therefore, stabilized.

The slurry of pulp fibres is discharged through the means 9 for the supply of an additional amount of liquid. First, the slurry is passed through the mass-discharging unit 16 and further delivered to the washing unit for the final product. This washing unit 17 ensures thickening of the final product, washing thereof and production of the waste liquor in a concentrated form. A portion of the waste liquor defined by the liquid modulus in the reaction vessel 1 and by the supply volume of fresh reagents thereinto as well as by operation conditions of the mass-discharging unit 16, is delivered by means of the pump 18 into the lower part of the reaction vessel 1 and hollow rod 20 via connecting pipelines 19. At the same time, this liquor is employed for cleaning of the fractionating means 22 and better separation of the non-digested mass from pulp fibres. The other portion of the waste liquor is delivered to a further use thereof, for example, for the production of protein feed yeast. The non-digested chips from the zone 24 for accumulation of coarse particles is delivered, via the transporting means 25, to the upper section of the reaction vessel 1 for a repeated treatment. This makes it possible to improve the final product quality due to a greater period of treatment of coarse particles. Consequently, the reaction vessel space is more employed efficiently.

Depending on the selected temperature conditions of the chip treatment, different zones of the reaction vessel 1 can be heated or cooled by means of heat-exchangers 6. The spent gas is removed from the upper section of the reaction vessel via the means 4, whereafter purified oxygen can be again fed into the means 3 also supplying a fresh oxygen-containing gas to replenish its losses and consumption for chemical reactions.

In the apparatus according to the present invention no continuous gaseous phase is employed, whereby the working space of the reaction vessel 1 is used more efficiently.

The apparatus according to the present invention is useful for treatment of a lignocellulose-containing material and for bleaching with an oxygen-containing gas simultaneously with ascending or descending displacement of the material in the reaction vessel 1.

In this case, perforated plates 7' mounted on the vertical rod 20 are abutting, by their total circumference, upon the inner surface of the column (FIGS. 5 and 6). Upon downward displacement of the material being treated, this material is fed by means of the feeder 2 into the upper section of the reaction vessel 1 having located therein perforated plates 7' having rectangular openings 12 disposed along concentric circles, as shown in FIG. 6, and provided with guiding vanes 13. The treated material is passed downwardly through the openings 12.

Intermixing of the material being treated with liquid reagents and oxygen-containing gas supplied into the lower section of the reaction vessel through the means 3, as well as displacement of the treated raw materials is effected by periodically supplying a pulse from the pulsator 11 via the pulse-line 10.

Temperature conditions of the treatment of the reaction vessel contents are controlled by means of heat-exchangers 6. The treated material is discharged through the mass-discharging unit 16 and is delivered to the washing means 17 for the final product. The spent gas is discharged from the reaction vessel 1 through the means 4.

When the treated material is passed into the lower section of the reaction vessel 1, the roles of feeder 2 and mass-discharging unit 16 should be exchanged. To accumulate the spent gas, the junction point of the means 4 to the reaction vessel 1 should be located higher than the point of junction of the feeder 2.

What is claimed is:

1. In an apparatus for producing a product from raw materials, a hollow reaction vessel in the form of a vertical column, a plurality of means communicating with said vessel for respectively feeding the raw materials thereto, admitting an oxygen-containing gas thereto, supplying liquid reagents thereto, discharging therefrom an output which includes a final product and liquor, and discharging spent gas therefrom, a tube connected to and communicating with the interior of said vessel and extending outwardly therefrom, a pulsator means at the exterior of said vessel operatively connected with said tube for providing through the latter pulses which set liquid reagents in said column into reciprocating vertical motion, and a plurality of substantially horizontal plates situated in said hollow reaction vessel and being spaced from each other while distributed vertically along the interior of said reaction vessel, each plate having a peripheral edge engaging an inner surface of said vessel, and each plate being formed with a plurality of openings passing therethrough and having at least at some of said openings thereof, respectively, a plurality of guide vane means respectively in line with said openings and inclined at an acute angle with respect to said plate for setting said liquid reagents into horizontal motion, so that the liquid reagents set into said vertical reciprocating motion by said pulsator means and tube will upon passing through said plate openings where said vane means are located be directed by said vane means to move substantially horizontally with respect to said plates, said pulsator means and said guide vane means thus subjecting said liquid reagents both to vertical and horizontal movement in said vessel without requiring the use of moving components in the interior of said vessel, said reaction vessel having opposed upper and lower end regions, and fractionating means extending across the interior of said vessel at one of said end regions thereof and dividing said one end region into an inner zone communicating with said plates and an outer zone separated by said fractionating means from said plates, said fractionating means permitting only relatively fine particles to reach said outer zone while retaining coarse particles at said inner zone, and transporting means communicating with said inner zone and with the other of said end regions for transporting the coarse particles from said inner zone to said other end region so that the coarse particles are recirculated through said vessel until they are fine enough to pass through said fractionating means to said outer zone, said tube communicating with said vessel at said outer zone so that the pulsations are delivered from said pulsator means through said tube into said outer zone, with said pulsator means also contributing by said pulsations to maintaining said fractionating means unclogged, said means for discharging said output communicating with said outer zone.

2. The combination of claim 1 and wherein a heat-exchanger means is operatively connected with and surrounds said vessel at the exterior thereof for controlling the temperature of the liquid reagents in said vessel.

3. The combination of claim 1 and wherein said means for supplying said alkaline reagent cooperates with said column for supplying the alkaline reagent thereto substantially along the entire height thereof.

4. The combination of claim 1 and wherein said plate openings and said guide vane means are arranged along arcs which extend at least in part around a central vertical axis of said vessel, so that the horizontal movement of the liquid reagents is a horizontal rotary movement.

5. The combination of claim 4 and wherein all of said openings of each plate are arranged along said arcs, and each opening being elongated and having a pair of opposed ends situated along one of said arcs, and the guide means at each opening including a pair of parallel vanes projecting from said opposed ends thereof and being inclined at said acute angle with respect to said plate with one of said vanes at each opening extending above the plate while the other of said vanes at each opening extends below the plate.

6. The combination of claim 5 and wherein said vanes at any one plate are all inclined in the same direction while the vanes at the plates between which said one plate is located are inclined oppositely to the vanes of said one plate, so that the direction of rotary motion imparted to the liquid reagents by said vanes changes from plate to plate.

7. The combination of claim 4 and wherein each plate has a peripheral edge extending through substantially more than 180° around the central axis of said vessel and engaging said inner surface thereof while each plate has on one side of said axis a substantially straight elongated edge region spaced from an inner surface of said vessel with said substantially straight edge regions of successive plates being situated at diametrically opposed sides of said axis, so that the liquid reagents while travelling from plate to plate are required to travel along a zigzag path, and each plate having at said substantially straight edge region thereof a baffle extending upwardly from said edge region toward the next higher plate while being spaced from the latter to provide with said next higher plate a clearance sufficient for relatively coarse particles to overflow said baffle while the relatively fine particles can pass through said plate openings.

8. The combination of claim 7 and wherein said baffles also extend in part downwardly from each plate at said substantially straight edge region thereof.

9. The combination of claim 7 and wherein the arcs along which the openings of each plate are distributed all intersect at a pair of points which are spaced from each other along a straight line which is perpendicular to and bisects said baffle.

10. The combination of claim 4 and wherein said openings are arranged along circles which concentrically surround the axis of said vessel and said arcs forming parts of said circles.

11. The combination of claim 10 and wherein each plate has an uninterrupted circular peripheral edge engaging the inner surface of said vessel.

12. The combination of claim 1 and wherein a hollow rod extends coaxially along the interior of said vessel and is connected with said plates while passing therethrough, said means for discharging said output communicating with said hollow rod for supplying part of the discharged liquor thereto, and said rod being formed between said plates with openings through which liquor is discharged into spaces between said plates for contributing to prevention of clogging of said openings thereof.

13. The combination of claim 12 and wherein said hollow rod is made up of a plurality of elongated tubular coaxial spacers situated between and connected with said plates and being formed with said openings through which liquor is discharged into the spaces between said plates.

14. The combination of claim 1 and wherein said means for discharging said output communicates with said outer zone for returning part of the discharged liquor thereto for contributing to prevention of clogging of said fractionating means.

15. The combination of claim 1 and wherein said means for discharging said output communicates with said vessel at said outer zone thereof and includes a discharging unit, a washing unit for the final product, a pump, and a pipe-line for waste liquor, all connected in series.

16. The combination of claim 15 and wherein said pipe-line for waste liquor includes a branch which communicates with said vessel for returning part of the waste liquor thereto.

* * * * *